(12) United States Patent
Satoh et al.

(10) Patent No.: US 10,774,201 B2
(45) Date of Patent: Sep. 15, 2020

(54) SYNTHETIC RUBBER LATEX AND METHOD FOR MANUFACTURING SAME

(71) Applicant: ZEON CORPORATION, Tokyo (JP)

(72) Inventors: Yoshitaka Satoh, Tokyo (JP); Junji Kodemura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 64 days.

(21) Appl. No.: 16/077,567

(22) PCT Filed: Mar. 2, 2017

(86) PCT No.: PCT/JP2017/008322
§ 371 (c)(1),
(2) Date: Aug. 13, 2018

(87) PCT Pub. No.: WO2017/154736
PCT Pub. Date: Sep. 14, 2017

(65) Prior Publication Data
US 2019/0031861 A1    Jan. 31, 2019

(30) Foreign Application Priority Data
Mar. 10, 2016    (JP) .................. 2016-046785

(51) Int. Cl.
*C08L 9/00* (2006.01)
*C08J 3/07* (2006.01)
*C08L 53/02* (2006.01)
*C08L 9/10* (2006.01)
*C09J 109/10* (2006.01)
(Continued)

(52) U.S. Cl.
CPC .................... *C08L 9/00* (2013.01); *B01F 3/08* (2013.01); *C08J 3/07* (2013.01); *C08K 5/0025* (2013.01); *C08L 9/08* (2013.01); *C08L 9/10* (2013.01); *C08L 53/02* (2013.01); *C09J 109/10* (2013.01); *A41D 13/08* (2013.01); *A41D 19/00* (2013.01); *C08K 2201/005* (2013.01)

(58) Field of Classification Search
USPC .................................................. 523/322, 346
See application file for complete search history.

(56) References Cited

U.S. PATENT DOCUMENTS 4,251,409 A    2/1981    Neubert
4,285,850 A    8/1981    Neubert
(Continued)

FOREIGN PATENT DOCUMENTS

| EP | 1935925 A1 | 6/2008 |
| EP | 3412707 A1 | 12/2018 |
| JP | S55-142635 A | 11/1980 |
| JP | S60-104170 A | 6/1985 |
| JP | S61-176645 A | 8/1986 |

(Continued)

OTHER PUBLICATIONS

Jun. 6, 2017 International Search Report issued in International Patent Application No. PCT/JP2017/008322.
(Continued)

*Primary Examiner* — Fred M Teskin
(74) *Attorney, Agent, or Firm* — Oliff PLC

(57) ABSTRACT

A latex of a synthetic rubber, wherein the content rate of a particle having a particle size of 5 μm or more in a particle size distribution of a synthetic rubber particle included in the latex, as determined on a number basis, is less than 3,000 ppm by weight. A latex of a synthetic rubber is excellent in mechanical stability and can provide a film molded article such as a dip molded article excellent in tensile strength and elongation.

7 Claims, 1 Drawing Sheet

(51) Int. Cl.
  *C08L 9/08*  (2006.01)
  *B01F 3/08*  (2006.01)
  *C08K 5/00*  (2006.01)
  *B01F 7/00*  (2006.01)
  *A41D 19/00*  (2006.01)
  *A41D 13/08*  (2006.01)

(56) References Cited

U.S. PATENT DOCUMENTS

| | | |
|---|---|---|
| 4,289,683 A | 9/1981 | Neubert |
| 4,300,972 A | 11/1981 | Neubert |
| 2009/0281211 A1 | 11/2009 | Van Der Huizen et al. |
| 2015/0087761 A1 | 3/2015 | Satoh et al. |
| 2019/0023854 A1 | 1/2019 | Ishii et al. |

FOREIGN PATENT DOCUMENTS

| | | |
|---|---|---|
| JP | 2012-062487 A | 3/2012 |
| JP | 2017-082132 A | 5/2017 |
| WO | 2013/099501 A1 | 7/2013 |

OTHER PUBLICATIONS

Sep. 23, 2019 Search Report issued in European Patent Application No. 17763076.1.

Sep. 11, 2018 International Preliminary Report on Patentability issued in International Patent Application No. PCT/JP2017/008322.

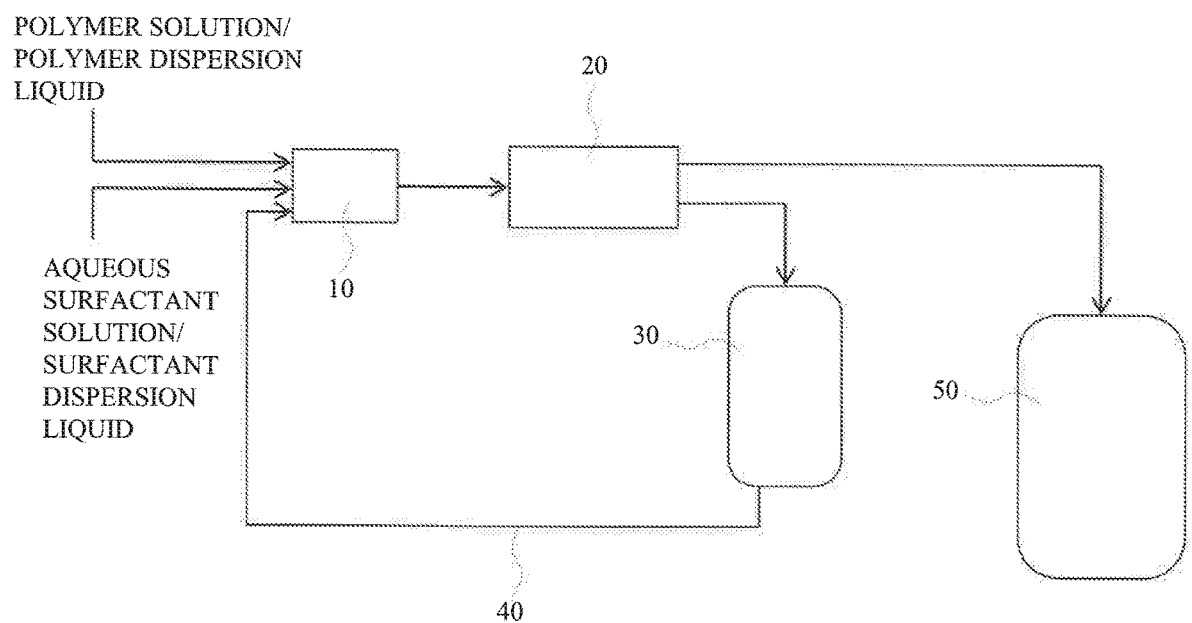

SYNTHETIC RUBBER LATEX AND METHOD FOR MANUFACTURING SAME

TECHNICAL FIELD

The present invention relates to a latex of a synthetic rubber, which is excellent in mechanical stability and which can provide a film molded article such as a dip melded article excellent in tensile strength and elongation, as well as a method for producing the same.

BACKGROUND ART

It has been conventionally known that a dip molded article for use in contact with the human body, such as a nipple, sin air ball, a glove, a balloon and a sack, is obtained by dip molding of a latex composition containing a latex of natural rubber. A latex of natural rubber, however, contains a protein causing an allergy symptom in the human body, and thus may be problematic in terms of use in a dip molded article that is in direct contact with the mucous membrane or organs of a living body. Therefore, studies about use of not a latest of natural robber, but a latex of a synthetic rubber such as synthetic polyisoprene and/or a styrene-isoprene-styrene block copolymer have been increasingly made (Patent Document 1).

For example, Patent Document 1 discloses a composition for dip molding, containing a latex of synthetic polyisoprene and/or a styrene-isoprene-styrene block copolymer having a weight average molecular weight of 10,000 to 5,000,000, and a sulfur-based vulcanizing agent and a vulcanization accelerator. The composition for dip molding described in Patent Document 1, however, has the following problem: the mechanical stability of a latex used for obtaining this composition is not sufficient and thus the storage stability of the latex is low, and thus rubber particle aggregation easily occurs in a subsequent step and an additional step of removing an aggregate is required; and the following problem: the occurrence of an aggregate causes a reduction in production efficiency (see Patent Document 1). In particular, such problems are remarkably caused when the cis content is as relatively high as 90% by weight.

RELATED ART

Patent Document

Patent Document 1: Japanese Patent Laid-Open Mo. 2012-62487

SUMMARY OF THE INVENTION

Problem to be Solved by the Invention

The present invention has been made in view of such circumstances, and an object thereof is to provide a latex of a synthetic rubber, which is excellent in mechanical stability and which can provide a film molded article such dip molded article tensile strength and elongation, as well as a method for producing the same.

Means for Solving the Problem

The present inventors have made intensive studies in order to achieve the above object, and as a result, have found that the above object can be achieved by the following: a latex of a synthetic rubber, wherein the content rate of a particle having a particle size of 5 μm or more in a particle size distribution of a synthetic rubber particle included in the latex, as determined on a number basis, is controlled to less than 3,000 ppm by weight; thereby leading to completion of the present invention.

That is, according to the present invention, there is provided a latex of a synthetic rubber, wherein a content rate of a particle raving a particle size of 5 μm or more in a particle size distribution of a synthetic robber particle included in the latex, as determined on a number basis, is leas than 3,000 ppm by weight.

It is preferable in the latex of a synthetic rubber according to the present invention that the synthetic rubber correspond to synthetic polyisoprene and/or a styrene-isoprene-styrene block copolymer.

According to the present invention, there is provided a latex composition containing the latex of a synthetic rubber, and a vulcanizing agent and/or a vulcanization accelerator.

According to the present invention, there is provided a film molded article including the latex composition.

According to the present invention, there is also provided an adhesive layer formation substrate including an adhesive layer formed by use of the latex of a synthetic rubber, on a substrate.

According to the present invention, there is further provided a method for producing a latex of a synthetic rubber, including:

a first step of mixing a polymer solution or a polymer dispersion liquid of a synthetic rubber, obtained by dissolution or dispersion of the synthetic rubber in an organic solvent, with an aqueous surfactant solution or a surfactant dispersion liquid obtained by dissolution or dispersion of a surfactant in water, to thereby obtain a mixture;

a second step of subjecting the mixture to a first dispersion treatment in a rotor/stator emulsifying machine, to thereby obtain a coarsely-dispersed emulsified liquid;

a third step of subjecting the coarsely-dispersed emulsified liquid to a second dispersion treatment in a rotor/stator emulsifying machine, to thereby obtain a finely-dispersed emulsified liquid; wherein when a dispersion energy F determined according to the following expression (1) is defined as follows: a dispersion energy F applied to the mixture in the first dispersion treatment in the second step is defined as a first dispersion energy $F_1$, a dispersion energy F applied to the coarsely-dispersed emulsified liquid in the second dispersion treatment in the third step is defined as a second dispersion energy $F_2$, and a sum of the first dispersion energy $F_1$ and the second dispersion energy $F_2$ is defined as a total dispersion energy $F_{total}$, the first dispersion treatment and the second dispersion treatment are performed such that the first dispersion energy $F_1$ is $8.0 \times 10^7$ or more and the total dispersion energy $F_{total}$ is $1.0 \times 10^8$ or more:

$$F = (V \times N \times P \times S)/Q^2 \qquad (1)$$

wherein V represents a circumferential speed (m/s) of a rotor, N represents a synthesis frequency (Hz) of the emulsifying machine, P represents a volume (m$^3$) of an emulsification chanter, S represents a cross-sectional area (m$^2$) of each slit provided on a rotor and a stator, and Q represents a dispersion treatment speed (m$^3$/s).

It is preferable in the method for producing a latex of a synthetic rubber according to the present invention that the second dispersion energy $F_2$ be $2.0 \times 10^7$ or more.

Effects of Invention

According to the present invention, there can provided of a synthetic rubber, which is excellent in mechanical stability and which can provide a film molded article such as a dip molded article excellent in tensile strength and elongation, as well as a method for producing such a latex of a synthetic rubber.

BRIEF DESCRIPTION OF DRAWING

The drawing is a view illustrating one example of a production apparatus for use in the production method of the present invention.

DESCRIPTION OF EMBODIMENTS

The latex of a synthetic rubber according to the present invention is a latex of a synthetic rubber, wherein the content rate of a particle having a particle size of 5 μm or more in the particle size distribution of a synthetic rubber particle included in the latex, as determined on a number basis, is less than 3,000 ppm by weight.

According to the present invention, the content rate of a particle having a particle size of 5 μm or more in the particle size distribution of a synthetic rubber particle constituting the latex of a synthetic rubber, as determined on a number basis, can be less than 3,000 ppm by weight, thereby allowing the latex to be excellent in mechanical stability, and also allowing a film molded article obtained, to be excellent in tensile strength and elongation when a film molded article such as a dip molded article is obtained. In particular, according to the present invention, mechanical stability can be excellent to thereby enhance the storage stability of the latex, thereby effectively preventing a rubber particle from aggregating in a subsequent step, and thus the problem of causing an additional step such as removal of an aggregate to be needed and the problem of causing production efficiency to be reduced due to the occurrence of an aggregate can be effectively solved. On the other hand, when the content rate of a particle having a particle size of 5 μm or more is 3,000 ppm by weight or more, mechanical stability is inferior to cause the latex to be low in storage stability, thereby easily causing rubber particle aggregation to occur in a subsequent step, and thus the problem of causing an additional step such as removal of an aggregate to be needed and the problem of causing production efficiency to be reduced, due to the occurrence of an aggregate are caused.

In the latex of a synthetic lubber according to the present invention, the content rate of a particle having a particle size of 5 μm or more in the particle size distribution of a synthetic rubber particle included in the latex, as determined on a number basis, is preferably 2,000 ppm by weight or less, and the lower limit thereof is usually 500 ppm by weight or more.

Herein, the volume average particle size of the synthetic rubber particle constituting the latex of a synthetic rubber according to the present invention is preferably 0.6 to 1.7 μm, more preferably 0.8 to 1.3 μm, further preferably 0.9 to 1.0 μm. The volume average particle size can be in the above range, thereby more enhancing the mechanical stability of the latex, and also allowing a film molded article obtained, to be more excellent in tensile strength and elongation when a film molded article such as a dip molded article is obtained.

The solid content concentration of the latex of a synthetic robber according to the present invention is preferably 30 to 70% by weight, more preferably 40 to 70% by weight. The solid content concentration is preferably in the above range because storage stability in storage of the latex of a synthetic rubber can be more enhanced.

Examples of the synthetic rubber constituting the latex of the synthetic rubber according to the present invention include, but are not particularly limited, homopolymers or copolymers of conjugate diene monomers such as synthetic polybutadiene, synthetic polyisoprene and synthetic polychloroprene; copolymers of conjugate diene monomers and other monomers copolymerliable therewith, such as a styrene-butadiene copolymer, a styrene-isoprene copolymer, a styrene-isoprene-styrene block copolymer, an acrylonitrile-butadiene copolymer, an acrylonitrile-isoprene copolymer, an acrylonitrile-butadiene-isoprene copolymer and a butyl acrylate-butadiene copolymer; and acrylate-type (co)polymers. Among them, synthetic polyisoprene and/or a styrene-isoprene-styrene block copolymer are/is preferable because of being excellent in tensile strength and elongation when formed into a film molded, article such as a dip molded article.

Hereinafter, a case where the latex of a synthetic rubber according to the present invention includes synthetic polyisoprene and/or a styrene-isoprene-styrene block copolymer is exemplified and described. It is noted that the present invention is not limited to such a latex of synthetic polyisoprene and/or a styrene-isoprene-styrene block copolymer at all.

Synthetic Polyisoprene Latex

The synthetic polyisoprene latex of the present invention is a latex of synthetic polyisoprene obtained by polymerization, of isoprene.

The synthetic polyisoprene included in the synthetic polyisoprene latex of the present invention tray be a homopolymer of isoprene, or a copolymerized product of isoprene and other ethylenically unsaturated monomer copolymerizable therewith. The content of the isoprene unit in the synthetic polyisoprene is preferably 70% by weight or more, more preferably 90% by weight or more, further preferably 95% by weight or more, particularly preferably 100% by weight (homopolymer of isoprene) relative to the total monomer unit, because a dip molded article that is flexible and that is excellent in tensile strength is easily obtained.

Examples of such other ethylenically unsaturated monomer copolymerizable with isoprene include conjugate diene monomers other than isoprene, such as butadiene, chloroprene and 1,3-pentadiene; ethylenically unsaturated, nitrile monomers such as acrylonitrile, methacrylonitrile, fumaronitrile and α-chloroacrylonitrile; vinyl aromatic monomers such as styrene and alkylstyrene; and ethylenically unsaturated carboxylic acid ester monomers such as methyl (meth)acrylate (which means "methyl acrylate and/or methyl methacrylate", and hereinafter, much the same is true on ethyl (meth) acrylate and the like.), ethyl (meth)acrylate, butyl (meth)acrylate and 2-ethylhexyl (meth)acrylate. Such other ethylenically unsaturated monomers copolymerizable with isoprene may be used singly or in combinations of a plurality of kinds.

The synthetic polyisoprene can be obtained by a conventionally known method, for example, can be obtained as a polymer solution of synthetic polyisoprene by solution polymerization of isoprene and other ethylenically unsaturated monomer copolymerizable therewith if necessary used, by use of a Ziegler type polymerization catalyst made of trialkyl aluminum-titanium tetrachloride or an alkyllithium polymerization catalyst such as n-butyllithium or sec-butyllithium, in an inert polymerization solvent.

In the present invention, synthetic polyisoprene obtained by use of a Ziegler type polymerization catalyst trade of trialkyl aluminum-titanium tetrachloride as the polymerization catalyst is preferable from the viewpoint that a high cis content is achieved and the tensile strength and flexibility of a film molded article to be formed, such as a dip molded article, can be favorable. In particular, when an alkyllithium polymerization catalyst such as sec-butyllithium is used, the cis content in the resulting synthetic polyisoprene is usually as low as less than 90% by weight, and therefore a Ziegler type polymerization catalyst is preferably used from such a viewpoint. The cis content in the synthetic polyisoprene is preferably 90% by weight or more, more preferably 95% by weight or more, further preferably 98% by weight or more. The cis content can be in the above range, thereby more enhancing the tensile strength and flexibility of a film molded article to be formed, such as a dip molded article.

Examples of the polymerization solvent can include aromatic hydrocarbon solvents such as benzene, toluene and xylene; alicyclic hydrocarbon solvents such as cyclopentane, cyclopentene, cyclohexane and cyclohexene; aliphatic hydrocarbon solvents such as butane, pentane, hexane and heptane; and halogenated hydrocarbon solvents such as methylene chloride, chloroform and ethylene dichloride. Among them, aliphatic hydrocarbon solvents are preferable, and butane is particularly preferable.

The isoprene unit in the synthetic polyisoprene is present in the form of four types including a cis bond unit, a trans bond unit, a 1,2-vinyl bond unit and a 3,4-vinyl bond unit depending on the binding state of isoprene. The content ratio of the cis bond unit in the isoprene unit included in the synthetic polyisoprene is preferably 70% by weight or more, more preferably 90% by weight or more, further preferably 95% by weight or more based on the total isoprene unit from the viewpoint of an enhancement in tensile strength of the resulting dip molded article.

The weight average molecular weight of the synthetic polyisoprene is preferably 10,000 to 5,000,000, more preferably 500,000 to 5,000,000, further preferably 800,000 to 3,000,000 in terms of standard polystyrene by gel permeation chromatography analysis. The weight average molecular weight of the synthetic polyisoprene is in the above range, thereby resulting in a tendency to not only enhance the strength of a film molded article obtained in formation of a film molded article such as a dip molded article, but also easily produce the synthetic polyisoprene latex.

The polymer Mooney viscosity (ML1+4, 100° C.) of the synthetic polyisoprene is preferably 50 to 80, more preferably 60 to 80, further preferably 70 to 80.

Next, the method for obtaining the synthetic polyisoprene latex of the present invention by use of the polymer solution of synthetic polyisoprene thus obtained is described with reference to the drawing.

The drawing is a view illustrating one example of a production apparatus for use in the production method of the present invention. The production apparatus illustrated in the drawing includes a mixer 10, a rotor/stator emulsifying machine 20, a storage tank 30, a reflux pipe 40 and a distillation tank 50.

First, in the production apparatus illustrated in the drawing, each of a polymer solution of synthetic polyisoprene, and an aqueous surfactant solution or a surfactant dispersion liquid obtained by dissolution or dispersion of a surfactant in water is sent to the mixer 10 by use of a common pump and mixed in the mixer 10 to provide a mixture, and the resulting mixture is then sent to the rotor/stator emulsifying machine 20 and subjected to a first dispersion treatment in the rotor/stator emulsifying machine 20, thereby obtaining a coarsely-dispersed emulsified liquid. The resulting coarsely-dispersed emulsified liquid is then recovered in the storage tank 30.

As the polymer solution of synthetic polyisoprene, a polymer solution of synthetic polyisoprene obtained by solution polymerization may be used as it is, or one obtained by taking out solid synthetic polyisoprene from the polymer solution after solution polymerization and dissolving it in an organic solvent may be used. Mien the solid synthetic polyisoprene is taken out from the polymer solution after solution polymerization and thereafter dissolved in an organic solvent, the organic solvent, that can be here used is the same as the organic solvent for use in polymerization of synthetic polyisoprene, and is here preferably an alicyclic hydrocarbon solvent, particularly preferably cyclohexane. The content ratio of the organic solvent in the polymer solution of synthetic polyisoprene is preferably 2,000 parts by weight or less, more preferably 20 to 1,500 parts try weight, further preferably 500 to 1300 parts by weight, frost preferably 700 to 900 parts by weight, based on 100 parts by weight of the synthetic polyisoprene.

An anionic surfactant be preferably used as the surfactant contained in the aqueous surfactant solution. Examples of the anionic surfactant include fatty acid salts such as sodium laurate, potassium myristate, sodium palmitate, potassium oleate, sodium linolenate and sodium rosinate; alkylbenzenesulfonic acid salts such as sodium dodecylbenzenesulfonate, potassium dodecylbenzenesulfanate, sodium decylbensenesulfonate, potassium decylbenzenesulfomte, sodium cetylbensenesulfonate and potassium cetylbenzenesulfonate; alkylsulfosuccinic acid salts such as sodium di(2-ethylhexyl)sulfosuccinate, potassium di(2-ethylhexyl) sulfosuccinate and sodium dioctylsulfosuccinate; alkylsulfuric acid ester salts such as sodium lauryl sulfate and potassium lauryl sulfate; polyoxyethylene alkyl ether sulfuric acid ester salts such as sodium polyoxyethylene lauryl ether sulfate and potassium polyoxyethylene lauryl ether sulfate; and monoalkyl phosphoric acid salts such as sodium lauryl phosphate and potassium lauryl phosphate, Among these anionic surfactants, fatty acid salts, alkylbenzenesulfonic acid salts, alkylsulfosuccinic acid salts, alkylsulfuric acid salts and polyoxyethylene alkyl ether sulfuric acid ester salts are preferable, and fatty acid salts and alkylbenzenesulfonic acid salts are particularly preferable.

The content ratio of the surfactant in the aqueous surfactant solution or the surfactant dispersion liquid is preferably 0.2 to 15.0% by weight, more preferably 0.5 to 5.0% by weight, further preferably 1.0 to 2.0% by weight. The amount of the aqueous surfactant solution or the surfactant dispersion liquid used relative to the polymer solution of synthetic polyisoprene is an amount such that the amount of the surfactant included in the aqueous surfactant solution or the surfactant dispersion liquid is preferably 0.1 to 50 parts by weight, more preferably 0.5 to 30 parts by weight, further preferably 1 to 20 parts by weight based on 100 parts by weight of the synthetic polyisoprene.

The mixer 10 may be any mixer as long as such a mixer can mix the polymer solution of synthetic polyisoprene with the aqueous surfactant solution or the surfactant dispersion liquid and is not particularly limited, and for example, a multiline mixer, a static mixer or a spiral pin mixer can be used.

The mixture obtained by mixing the polymer solution of synthetic polyisoprene with the aqueous surfactant solution or the surfactant dispersion liquid in the mixer 10 is then sent to the rotor/stator emulsifying machine 20, and the first dispersion treatment is performed, in the rotor/stator emulsifying machine 20 to thereby obtain the coarsely-dispersed emulsified liquid. The rotor/stator emulsifying machine 20 may be any apparatus in which a rotor having a plurality of slits is relatively rotated to a stator having a plurality of slits to thereby apply a shear force to the mixture, and is not particularly limited, and for example, an apparatus that has a plurality of such rotor/stator pairs is suitably used. Examples of such a rotor/stator emulsifying machine 20 include continuous emulsifying machines such as trade name "TK-pipeline homomixer" (manufactured by Primix Corporation), trade name "Colloid Mill" (manufactured by Shinko Pantech Co., Ltd.), trade name "Slusher" (manufactured by Nippon Coke & Engineering. Co., Ltd.), trade name "Trigonal wet fine pulverizer" (manufactured by Mitsui Miike Machinery Co., Ltd.), trade name "Cavirton" (manufactured by Eurotech Co., Ltd.), trade name "Milder" (manufactured by Pacific Machinery & Engineering Co., Ltd.), and trade name "Fine flow mill" (manufactured by Pacific Machinery & Engineering Co., Ltd.).

In the first dispersion treatment, dispersion is desirably performed such that, when the dispersion energy F applied to the mixture is defined as a first dispersion energy $F_1$ with respect to the dispersion energy F determined according to the following expression (1), the first dispersion energy $F_1$ in the first dispersion treatment is $8.0 \times 10^7$ or more.

$$F = (V \times N \times P \times S)/Q^2 \qquad (1)$$

In the egression (1), V represents the circumferential speed (m/s) of each rotor, and is determined from, the rotation speed and the outer diameter of the rotor constituting each rotor/stator pair.

N represents the synthesis frequency (Ks) of the emulsifying machine and depends on the number of combinations of rotor/stator pairs and the number of slits provided on each rotor/stator. As one example, when the outer diameter is 30 mm, the circumferential speed is 19 m/s, the number of rotor/stator pair(s) is 1, the number of slits of each rotor is 8 and the number of slits of each stator is 12, the synthesis frequency is 19,000 Hz.

P represents the volume ($m^3$) of an emulsification chamber, and the volume specifically means the volume of a portion in which an object to be dispersed can remain, in a space where rotor/stator pairs are disposed, and also means the volume including the volumes of rotors, stators and the like in the emulsification chamber.

S represents the cross-sectional area ($m^2$) of each slit provided on the rotors and the stators, and specifically means the sum of the cross-sectional area of each one slit.

Q represents the dispersion treatment speed ($m^3/s$), and is determined by the flow rate of an object to be dispersed.

In the present invention, the first dispersion treatment can be performed such that the first dispersion energy $F_1$ is $8.0 \times 10^7$ or more and furthermore the second dispersion treatment can be performed such that a total dispersion energy $F_{total}$ described below is $1.0 \times 10^8$ or more, thereby allowing the content rate of a particle having a particle size of 5 μm or more in the particle size distribution of the rubber particle included in the resulting synthetic polyisoprene latex, as determined on a number basis, to be less than 3,000 ppm by weight. If the first dispersion energy $F_1$ is less than $8.0 \times 10^7$, the content rate of a particle having a particle size of 5 μm or more in the particle size distribution is 3,000 ppm by weight or more, and the mechanical stability of the latex is inferior.

The first dispersion energy $F_1$ is $8.0 \times 10^7$ or more, preferably $8.5 \times 10^7$ or more, more preferably $1.0 \times 10^8$ or more. The upper limit of the first dispersion energy $F_1$ is not particularly limited, and is usually, $1.5 \times 10^8$ or less.

The first dispersion treatment is then, performed in the rotor/stator emulsifying machine 20 at the first dispersion energy $F_1$, and thereafter the resulting coarsely-dispersed emulsified liquid is recovered in the storage tank 30.

Next, the coarsely-dispersed emulsified liquid recovered in the storage tank 30 is returned to the mixer 10 through the reflux pipe 40 and stirred in the mixer 10, and thereafter sent again to the rotor/stator emulsifying machine 20. The coarsely-dispersed emulsified liquid is then subjected to the second dispersion treatment in the rotor/stator emulsifying machine 20, thereby obtaining a finely-dispersed emulsified liquid, and the resulting finely-dispersed emulsified liquid is recovered in the distillation tank 50. The liquid to be subjected to the second dispersion treatment is sent by means of the stirring force of the rotor/stator emulsifying machine 20.

In the second dispersion treatment, dispersion is desirably performed such that, when the dispersion energy F applied to the coarsely-dispersed emulsified liquid is defined as a second dispersion energy $F_2$ and the sum of the first dispersion energy $F_1$ and the second dispersion energy $F_2$ is defined as a total dispersion energy $F_{total}$ with respect to the dispersion energy F determined according to the expression (1), the total dispersion energy $F_{total}$ is $1.0 \times 10^8$ or more.

In the present invention, the first dispersion treatment can be performed such that the first dispersion energy $F_1$ is $8.0 \times 10^7$ or more and furthermore the second dispersion treatment can be performed such that the total dispersion energy $F_{total}$ is $1.0 \times 10^8$ or more, as described above, thereby allowing the content rate of a particle having a particle size of 5 μm or more in the particle size distribution of the rubber particle included in the resulting synthetic polyisoprene latex, as determined on a number basis, to be less than 3,000 ppm by weight. If the total dispersion energy $F_{total}$ is less than $1.0 \times 10^8$, the content rate of a particle having a particle size of 5 μm or more in the particle size distribution is 3,000 ppm by weight or more, and the mechanical stability of the latex is inferior.

In the present invention, the first dispersion energy $F_1$ in the first dispersion treatment is $8.0 \times 10^7$ or more. For example, when a condition of a first dispersion energy $F_1$ of $1.0 \times 10^8$ or more is adopted, the total dispersion energy $F_{total}$ is $1.0 \times 10^8$ or more even if the second dispersion treatment is not performed, and on the other hand, when the second dispersion treatment is not performed, there may be a case where the content rate of a particle having a particle size of 5 μm or more in the particle size distribution is not less than 3,000 ppm by weight, and a case where the production efficiency is remarkably reduced. Therefore, in the present invention, the second dispersion treatment is desirably performed after the first dispersion treatment, and the second dispersion treatment is preferably performed under a condition where the second dispersion energy $F_2$ in the second dispersion treatment is preferably $2.0 \times 10^7$ or more, more preferably $2.5 \times 10^7$ or more, further preferably $5.0 \times 10^7$ or more. The upper limit of the second dispersion energy $F_2$ is not particularly limited, and is usually, $1.5 \times 10^8$ or less.

The total dispersion energy $F_{total}$ is $1.0 \times 10^8$ or more, preferably $1.3 \times 10^8$ or more, more preferably $1.5 \times 10^8$ or more. The upper limit of the total dispersion energy $F_{total}$ is not particularly limited, and is usually $3.0 \times 10^8$ or less.

While the second dispersion treatment may be performed under a condition of a total dispersion energy $F_{total}$ of $1.0 \times 10^8$ or more, the second dispersion treatment tray also be performed multiple times if the total dispersion energy $F_{total}$ does not reach $1.0 \times 10^8$ or more by one dispersion treatment or the total dispersion energy $F_{total}$ is tried to be further increased. That is, a mode may be adopted where the dispersion treatment is performed twice (two passes with respect to the second dispersion treatment) by returning the coarsely-dispersed emulsified liquid stored in the storage tank 30 to the mixer 10 through the reflux pipe 40 and then subjecting it to a dispersion treatment in the rotor/stator emulsifying machine 20, thereafter returning the resultant to the storage tank 30, again returning it to the mixer 10 through the reflux pipe 40 and then subjecting it to a dispersion treatment in the rotor/stator emulsifying machine 20, and recovering the resulting finely-dispersed emulsified liquid in the distillation tank 50, or a mode may be adopted where the dispersion treatment may be performed three or more times (three or more passes with respect to the second dispersion treatment). For example, when the dispersion treatment is performed twice, a mode may be adopted where the dispersion treatment is performed continuously for a time required for performing the dispersion treatment twice. Furthermore, for example, when the dispersion treatment is performed three, four, or more times, a mode may be adopted where the dispersion treatment is performed continuously for a time required for performing the dispersion treatment three, four, or more times.

In the present invention, the finely-dispersed emulsified liquid recovered after the second dispersion treatment is desirably subjected to a treatment for removal of the organic solvent in the distillation tank 50, The method for removing the organic solvent from the finely-dispersed emulsified liquid is preferably a method that can allow the content, of the organic solvent (preferably alicyclic hydrocarbon solvent) in the resulting synthetic polyisoprene latex to be 500 ppm by weight or less, and for example, a method of distillation under reduced pressure, atmospheric distillation, steam distillation or the like can be adopted.

The finely-dispersed emulsified liquid thus obtained can be then, if necessary, subjected to adjustment of the solid content concentration, such as a concentration operation, pH adjustment, or the like to thereby obtain the synthetic polyisoprene latex. Examples of such a concentration operation include methods such as distillation under reduced pressure, atmospheric distillation, centrifugation and membrane concentration, and centrifugation among them is preferable from the viewpoint that the remaining amount of the surfactant in the synthetic polyisoprene latex can be reduced.

In the present invention, a carboxyl group may be, if necessary, introduced to the synthetic polyisoprene included in the synthetic polyisoprene latex, thereby providing carboxyl group-containing synthetic polyisoprene. Examples of the method for introducing a carboxyl group to the synthetic polyisoprene include, but are not particularly limited, a method for graft polymerization of a monomer having a carboxyl group to the synthetic polyisoprene in the latex. As the graft polymerisation method, a conventionally known method can be used, and a method described in International Publication WO 2014/129547 can be used.

Styrene-Isoprene-Styrene Block Copolymer Latex

The styrene-isoprene-styrene block copolymer latex of the present invention is a latex of a block copolymer of styrene and isoprene.

The content ratio of the styrene unit and the isoprene unit in the styrene-isoprene-styrene block copolymer is usually in the range of 1:99 to 90:10, preferably 3:97 to 70:30, more preferably 5:95 to 50:50, further preferably 10:90 to 30:70, in terms of the weight ratio "styrene unit:isoprene unit".

The styrene-isoprene-styrene block copolymer can be obtained by a conventionally known method, for example, can be obtained as a polymer solution of a styrene-isoprene-styrene block copolymer by block copolymerization of isoprene and styrene by use of a Ziegler type polymerization catalyst made of trialkyl aluminum-titanium tetrachloride or an alkyllithium polymerization catalyst, such as n-butyllithium or sec-butyllithium, in an inert polymerization solvent.

In the present invention, a styrene-isoprene-styrene block copolymer obtained by use of a Ziegler type polymerization catalyst made of trialkyl aluminum-titanium tetrachloride as the polymerization catalyst is preferable from the viewpoint that a high cis content is achieved and the tensile strength and flexibility of a film molded article to be formed, such as a dip molded article, can be favorable. The cis content in the styrene-isoprene-styrene block copolymer is preferably 90% by weight or more, more preferably 95% by weight or more, further preferably 98% by weight or more. The cis content can be in the above range, thereby more enhancing the tensile strength and flexibility of a film molded article to be formed, such as a dip molded article. As the polymerization solvent, the same as in the above-mentioned synthetic polyisoprene latex can be used.

The weight average molecular weight of the styrene-isoprene-styrene block copolymer is preferably 10,000 to 1,000,000, more preferably 50,000 to 500,000, further preferably 100,000 to 300,000 in terms of standard polystyrene by gel permeation chromatography analysis. The weight average molecular weight of the styrene-isoprene-styrene block copolymer is in the above range, thereby resulting in a tendency to not only enhance the tensile strength of a film molded article obtained in formation of a film molded article such as a dip molded article, but also easily produce the styrene-isoprene-styrene block copolymer latex.

The polymer Mooney viscosity (ML1+4, 100° C.,) of the styrene-isoprene-styrene block copolymer is preferably 50 to 80, more preferably 60 to 80, further preferably 70 to 80.

In the present invention, the production apparatus illustrated in the drawing can be used to obtain the styrene-isoprene-styrene block copolymer latex of the present invention from the polymer solution of styrene-isoprene-styrene block copolymer, as in the case where the synthetic polyisoprene latex is obtained.

That is, even when the styrene-isoprene-styrene block copolymer latex of the present invention is obtained from the polymer solution of styrene-isoprene-styrene block copolymer, the polymer solution of styrene-isoprene-styrene block copolymer and the aqueous surfactant solution or the surfactant dispersion liquid are mixed in the mixer 10 to provide a mixture, the resulting mixture is sent to the rotor/stator emulsifying machine 20 by means of the stirring force of the mixer 10, the first dispersion treatment is performed at the first dispersion energy in the rotor/stator emulsifying machine 20 to obtain a coarsely-dispersed emulsified liquid, and the resulting coarsely-dispersed emulsified liquid is recovered in the storage tank 30, as in the above case.

The resulting coarsely-dispersed emulsified liquid is similarly returned to the mixer 10 through the reflux pipe 40 and stirred in the mixer 10, and thereafter sent, again to the rotor/stator emulsifying machine 20 by means of the stirring force of the mixer 10. The coarsely-dispersed emulsified liquid is then subjected to the second dispersion treatment at the second dispersion energy $F_2$ in the rotor/stator emulsifying machine 20, thereby obtaining a finely-dispersed emulsified liquid, and the resulting finely-dispersed emulsified liquid is recovered in the distillation tank 50. The finely-dispersed emulsified liquid can be then, if necessary, subjected to a treatment for removal of the organic solvent, and thereafter can be then, if necessary, subjected to adjustment of the solid content concentration, such as a concentration operation, pH adjustment, or the like to thereby obtain the styrene-isoprene-styrene block copolymer latex.

Also in such a case, the first dispersion energy $F_1$ is $8.0 \times 10^7$ or more, preferably $8.5 \times 10^7$ or more, more preferably $1.0 \times 10^8$ or more. The upper limit of the first dispersion energy $F_1$ is not particularly limited, and is usually, $1.5 \times 10^8$ or less. The total dispersion energy $F_{total}$ is $1.0 \times 10^8$ or more, preferably $1.3 \times 10^8$ or more, more preferably $1.5 \times 10^8$ or more. The upper limit of the total dispersion energy $F_{total}$ is not particularly limited, and is usually $3.0 \times 10^8$ or less. Furthermore, the second dispersion energy $F_2$ in the second dispersion treatment is preferably $2.0 \times 10^7$ or more, more preferably $2.5 \times 10^7$ or more, further preferably $5.0 \times 10^7$ or more. The upper limit of the second dispersion energy $F_2$ is not particularly limited, and is usually $1.5 \times 10^8$ or less.

In the present invention, a carboxyl group may be, if necessary, introduced to the styrene-isoprene-styrene block copolymer included in the styrene-isoprene-styrene block copolymer latex, thereby providing a carboxyl group-containing styrene-isoprene-styrene block copolymer. Examples of the method for introducing a carboxyl group to the styrene-isoprene-styrene block copolymer include, but are not particularly limited, a method for graft polymerization of a monomer having a carboxyl group to the styrene-isoprene-styrene block copolymer in the latex.

Latex Composition

The latex composition of the present invention is obtained by compounding a vulcanizing agent and/or a vulcanization accelerator to the above-mentioned latex of a synthetic rubber according to the present invention.

Examples of the vulcanizing agent include sulfur such as powdered sulfur, sublimed sulfur, precipitated sulfur, colloidal sulfur, surface-treated sulfur and insoluble sulfur; and sulfur-containing compounds such as sulfur chloride, sulfur dichloride, morpholine-disulfide, alkylphenol-disulfide, caprolactam disulfide (N,N'-dithio-bis (hexahydro-2H-azepinone-)), phosphorus-containing polysulfide, polymeric polysulfide and 2-(4'-morpholinodithio)benzothiazole. Among them, sulfur can be preferably used. Such vulcanizing agents can be used singly or in combinations of two or more kinds thereof.

The content of the vulcanizing agent is not particularly limited, and is preferably 0.1 to 10 parts by weight, more preferably 0.2 to 3 parts by weight based on 100 parts by weight of the synthetic rubber included in the latex. The content of the vulcanizing agent can be in the above range, thereby more enhancing the tensile strength of a film molded article to be obtained, such as a dip molded article.

The vulcanization accelerator that can be used is a vulcanization accelerator commonly used in the method for obtaining a film molded article such as dip molding, and examples include dithiocarbamic acids such as diethyldithiocarbamic acid, dibutyldithiocarbamic acid, di-2-ethylhexyldithiocarbamic acid, dicyclohexyldithiocarbamic acid, diphenyldithiocarbarmic acid and dibenzyldithiocarbamic acid, and zinc salts thereof; and 2-mercaptobenzothiazole, zinc 2-mercaptobenzothiazole, 2-mercaptothiazoline, dibenzothiazyl-disulfide, 2-(2,4-dinitrophenylthio)benzothiazole, 2-(N,N-diethylthio-carbaylthio)benzothiazole, 2-(2,6-dimethyl-4-morpholinothio)benzothiazole, 2-(4'-morpholinodithio)benzothiazole, 4-morpholinyl-2-benzothiazyl-disulfide and 1,3-bis(2-benzothiazyl-mercaptomethyl)urea, and zinc 2-diethyldithiocarbamate, zinc 2-dibutyldithiocarbamate and zinc 2-mercaptobenzothiazole are preferable. Such vulcanization accelerators can be used singly or in combinations of two or more kinds thereof.

The content of the vulcanization accelerator is preferably 0.05 to 5 parts by weight, more preferably 0.1 to 2 parts by weight based on 100 parts by weight of the synthetic rubber included in the latex. The content of the vulcanization accelerator can be in the above range, thereby enhancing the tensile strength of a film molded article to be obtained, such as a dip molded, article.

The latex composition of the present invention preferably further contains zinc oxide.

The content of zinc oxide is not particularly limited, and is preferably 0.1 to 5 parts by weight, more preferably 0.2 to 2 parts toy weight based on 100 parts toy weight of the synthetic rubber included in the latex. The content of zinc oxide can be in the above range, thereby imparting good, emulsification stability and also more enhancing the tensile strength of a film molded article to be obtained, such as a dip molded article.

To composition of the present invention can be further compounded a compounding agent, for example, an antioxidant; a dispersing agent; a reinforcing agent such as carbon black, silica or talc; a filler such as calcium carbonate or clay; an ultraviolet absorber; or a plasticizer.

Examples of the antioxidant include phenol-based antioxidants containing no sulfur atom, such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl)propionate, styrenated phenol, 2,2'-methylenebis(6-α-methyl-benzyl-p-cresol), 4,4'-methylenebis (2,6-di-t-butylphenol), 2,2'-methylenebis(4-methyl-6-t-butylphenol), alkylated bisphenol, and a butylated reaction product of p-cresol and dicyclopentadiene; thiobisphenol-based antioxidants such as 2,2'-thiobis-(4-methyl-6-t-butylphenol), 4,4'-thiobis-(6-t-butyl-o-cresol) and 2,6-di-t-butyl-4-(4,6-bis(octylthio)-1,3,5-triazine-2-ylamino) phenol; phosphorous acid ester-based antioxidants such as tris (nonylphenyl)phosphite, diphenylisodecyl phosphite and tertaphenyl dipropylene glycol-diphosphite; sulfur ester-based antioxidants such as dilauryl thiodiprcpionate; amine-based antioxidants such as phenyl-α-naphtliylamine, phenyl-β-naphthylamine, p-(p-toluenesulfonylamide)-diphenylamine, 4,4'-(α,α-dimethylbenzyl)diphenylamine, N,N-diphenyl-p-phenylenediainine, N-isopropyl-N'-phenyl-p-phenylenediamine and a butylaldehyde-aniline condensate; quinoline-based antioxidants such as 6-ethoxy-2,2,4-trimethyl-1,2-dihydroquinoline; and hydroquinone-based antioxidants such as 2,5-di-(t-amyl)hydroquinone. Such antioxidants can be used singly or in combinations of two or more kinds thereof.

The content of the antioxidant, is preferably 0.05 to 10 parts by weight, more preferably 0.1 to 5 parts try weight based on 100 parts by weight of the synthetic rubber included in the latex.

Examples of the method for preparing the latex composition of the present invention include, but are not particularly limited, a method including mixing the vulcanizing agent and/or vulcanization accelerator and various expounding agents, if necessary compounded, with the latex of a synthetic rubber by use of a dispersing machine such as a ball mill, a kneader or a disper, and a method including preparing an aqueous dispersion liquid of compounding components other than the latex of a synthetic rubber, by use of such a dispersing machine, and thereafter mixing the aqueous dispersion liquid with the latex of a synthetic rubber.

The pH of the latex composition of the present invention is preferably 7 or more, more preferably in the range of 7 to 13, further preferably in the range of 8 to 12. The solid content concentration of the latex composition is preferably in the range of 15 to 65% by weight.

The latex composition of the present invention is preferably subjected to aging (pre-crosslinking) before molding such as dip molding from the viewpoint that mechanical properties of a film molded article to be obtained, such as a dip molded article are more enhanced. The pre-crosslinking is not particularly limited and is preferably 1 to 14 days, more preferably 1 to 7 days, depending on the pre-crosslinking temperature. Herein, the pre-crosslinking time is preferably 20 to 40° C.

The resultant is preferably stored at a temperature of 10 to 30° C. for the period from completion of the pre-crosslinking to molding such as dip molding. If the resultant is stored at a high temperature, the tensile strength of a film molded article to be obtained, such as a dip molded article, may be reduced.

Film Molded Article

The film molded article of the present invention is a film molded article made of the latex composition of the present invention. The thickness of the film molded article of the present invention is preferably 0.03 to 0.50 mm, more preferably 0.05 to 0.40 mm, particularly preferably 0.08 to 0.30 mm.

The film molded article of the present invention is not particularly limited, and is suitably a dip molded article obtained by dip molding of the latex composition of the present invention. Dip molding means a method including dipping a mold in the latex composition to deposit the composition on the surface of the mold, then lifting the mold from the composition, and thereafter drying the composition deposited on the surface of the mold. Herein, the mold before dipping in the latex composition may be pre-heated. A coagulating agent can be, if necessary, used before the mold is dipped in the latex composition or after the mold is lifted from the latex composition.

Specific example of the method of using the coagulating agent preferably include a method including dipping the mold before dipping in the latex composition, in a solution of the coagulating agent, to attach the coagulating agent to the mold (anode coagulation dipping method) and a method including dipping the mold on which the latex composition is deposited, in a coagulating agent solution (Teague coagulation dipping method), and an anode coagulation dipping method is preferable from the viewpoint that a dip molded article small in thickness variation is obtained.

Specific examples of the coagulating agent include water-soluble polyvalent metal salts, for example, metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Among them, a calcium salt is preferable, and calcium nitrate is more preferable. Such water-soluble polyvalent metal salts can be used singly or in combinations of two or more kinds thereof.

The coagulating agent is preferably used in the form of an aqueous solution. The aqueous solution may further contain a water-soluble organic solvent such as methanol or ethanol, and/or a nonionic surfactant. The concentration of the coagulating agent varies depending on the type of the water-soluble polyvalent metal salt, and is preferably 5 to 50% by weight, more preferably 10 to 30% by weight.

After the mold is lifted from the latex composition, the deposit formed on the mold usually by heating is dried. The drying conditions may be appropriately selected.

Next, the deposit formed on the mold by heating is crosslinked.

While the heating conditions in crosslinking are not particularly limited, the heating temperature is preferably 60 to 150° C., more preferably 100 to 130° C., and the heating time is preferably 10 to 120 minutes.

Examples of the heating method include, but are not particularly limited, a method of heating by hot air in an oven and a method of heating by irradiation with infrared light.

In order to remove water-soluble impurities (for example, excessive surfactant and/or coagulating agent) before or after heating the mold on which the latex exposition is deposited, the mold is preferably washed with water or warm water. The warm water used is preferably at 40° C. to 80° C., more preferably at 50° C. to 70° C.

The dip molded, article after crosslinking is detached, from the mold. Specific examples of the detaching method include a method for releasing the article from the mold by hand and a method for releasing the article by water pressure or compressed air pressure. When the dip molded article during crosslinking has a sufficient strength for detaching, the dip molded article may be detached during crosslinking and continuously subsequently crosslinked.

The film molded article of the present invention, and the dip molded article according to one aspect of the present invention are obtained using the latex of the present invention, and are thus excellent in tensile strength and elongation and can be each particularly suitably used as a glove. When the film molded article is a glove, an inorganic fine particle of talc, calcium carbonate or the like, or an organic fine particle such as a starch particle may be spread on the glove surface, an elastomer layer containing a fine particle may be formed on the glove surface, or the surface layer of the glove may be chlorinated, in order to prevent adhesion on the contact surface of the film molded article to thereby enhance slipping during detachment.

The film molded article of the present invention, and the dip molded article according to one aspect of the present invention can also be used in, other than the glove, medical products such as a nipple for baby bottles, a dropper, a tube, a water cushion, a balloon sack, a catheter and a condom; toys such as an air ball, a doll and a ball; industrial products such as a bag for pressure molding and a bag for gas storage; and a fingerstall.

Adhesive Layer Formation Substrate

The adhesive layer formation substrate of the present invention is a composite material of a substrate on which an adhesive layer formed by use of the above-mentioned latex of a synthetic rubber according to the present invention is provided, and the adhesive layer.

The substrate is not particularly limited, and for example, a fiber substrate can be used. The type of a fiber constituting substrate is not particularly limited, and examples thereof include polyamide fibers such as a vinylon fiber, a polyester fiber, nylon and aramid (aromatic polyamide), a glass fiber, cotton, and rayon. These can be appropriately selected, depending on the intended use. Examples of the shape of the fiber substrate can include, but are not particularly limited, staple, filament, a cord shape, a rope shape, and a woven cloth (sail cloth and the like), and such shapes can be appropriately selected depending on the intended use.

The adhesive layer may be formed by use of the above-mentioned latex of a synthetic rubber according to the present invention, and the adhesive layer may be used as it is with no compounding agent and the like being compounded in the above-mentioned latex of a synthetic rubber according to the present invention, or the adhesive layer may be formed by use of an adhesive composition obtained by compounding various compounding agents.

Examples of the expounding agent contained in the adhesive composition include an adhesive resin. The adhesive resin is not particularly limited, for example, a resorcin-formaldehyde resin, a melamine resin, an epoxy resin and an isocyanate resin can be suitably used, and among them, a resorcin-formaldehyde resin is preferable. A known resorcin-formaldehyde resin (for example, one disclosed in Japanese Patent Laid-Open No. 55-142635) can be used as the resorcin-formaldehyde resin. The reaction ratio of resorcin and formaldehyde is usually 1:1 to 1:5, preferably 1:1 to 1:3 in terms of the molar ratio "resorcin:formaldehyde".

The adhesive composition can also contain 2,6-bis(2,4-dihydroxyphenylmethyl)-4-chlorophenol or an analogue compound, isocyanate, block isocyanate, ethylene urea, polyepoxide, a modified vinyl chloride resin, and the like conventionally used, for a further enhancement in adhesion force.

The adhesive composition can further contain a vulcanization aid. A vulcanization aid can be contained, thereby enhancing the mechanical strength of the adhesive layer formation substrate. Examples of the vulcanization aid include quinone dioximes such as p-quinone dioxime; methacrylic acid esters such as lauryl methacrylate and methyl methacrylate; allyl compounds such as DAF (diallyl fumarate), DAP (diallyl phthalate), TAC (triallyl cyanurate) and TAIC (triallyl isocyanurate); maleimide compounds such as bismaleimide, phenylmaleimide and N,N-m-phenylenedimaleimide; and sulfur.

The content (solid content) of the synthetic rubber in the adhesive composition is preferably 5 to 60% by weight, more preferably 10 to 30% by weight.

The adhesive layer formation substrate of the present invention can be obtained by forming the adhesive layer on the substrate, according to, for example, a method for coating the substrate surface with the latex of a synthetic rubber according to the present invention or an adhesive composition containing such a latex, or a method for dipping the substrate in the latex of a synthetic rubber according to the present invention or an adhesive composition containing such a latex.

Such an adhesive layer formation substrate of the present invention can, for example, adhere to rubber with the adhesive layer interposed therebetween, and thus used as a substrate-rubber composite. Examples of the substrate-rubber composite include, but are not particularly limited, a rubber toothed belt including a core, in which a cord-shaped substrate is used as a fiber substrate, and a rubber toothed belt in which a foundation cloth-like fiber substrate such as a sail cloth is used.

Examples of the method for obtaining the substrate-rubber composite include, but are not particularly limited, a method including attaching the latex of a synthetic rubber according to the present invention, or an adhesive composition containing the latex of a synthetic rubber to a substrate by a coating method, a dipping treatment or the like, to thereby obtain the adhesive layer formation substrate, disposing the adhesive layer formation substrate on rubber, and heating and pressurizing the resultant. Such pressurizing can be performed by use of a compression (press) molding machine, a metal roll, an injection molding machine or the like. The pressure in such pressurizing is preferably 0.5 to 20 MPa, more preferably 2 to 10 MPa. The temperature in such heating is preferably 130 to 300° C., more preferably 150 to 250° C. The treatment time for such heating and pressurizing is preferably 1 to 180 minutes, more preferably 5 to 120 minutes. Such a heating and pressurizing method enables molding of rubber and adhesion of the adhesive layer formation substrate and the rubber to be simultaneously performed. It is herein preferable to form a mold for providing a desired, surface shape on the rubber of an objective substrate-rubber composite, on the inner surface and/or roll surface of a mold of a compression machine for use in such pressurizing.

One aspect of the substrate-rubber composite can include a substrate-rubber-substrate complex. The substrate-rubber-substrate complex can be formed by, for example, combining a substrate (which may be a complex of two or more substrates.) and the substrate-rubber composite. Specifically, the substrate-rubber-substrate complex can be obtained by stacking a core serving as the substrate, rubber, and a foundation cloth serving as the substrate (where the latex of a synthetic rubber according to the present invention, or the adhesive composition containing the latex of a synthetic rubber is appropriately attached to the core and the foundation cloth to provide the adhesive layer formation substrate), and pressurizing the stacked product with heating.

The substrate-rubber composite obtained by use of the adhesive layer formation substrate of the present invention is excellent in mechanical strength, wear resistance and water resistance, and therefore can be suitably used for a belt such as a flat belt, a V-belt, a V-ribbed belt, a round belt, a square belt or a toothed belt. The substrate-rubber composite obtained by use of the adhesive layer formation substrate of the present invention is excellent in oil resistance and can also be suitably used for an oil belt. Furthermore, the substrate-rubber composite obtained by use of the adhesive layer formation substrate of the present invention can also be suitably used for a hose, a tube, a diaphragm or the like. Examples of the hose include a single-tube rubber hose, a multilayer rubber hose, a knitted reinforced hose and a cloth-wrapped reinforced hose. Examples of the diaphragm include a flat diaphragm and a rolling type diaphragm.

The substrate-rubber composite obtained by use of the adhesive layer formation substrate of the present invention can be used for industrial products such as a seal and a rubber roll, in addition to the above applications. Examples of the seal include moving part seals such as rotary, rocking, and reciprocally moving seals, and fixing part seals. Examples of the moving part seal include an oil seal, a piston seal, a mechanical seal, boot, a dust cover, a diaphragm, and an accumulator. Examples of the fixing part seal include an O ring and various gaskets. Examples of the rubber roll include rolls as parts for OA equipment such as a printer and a copier; rolls for fiber processing, such as a stretching roll for spinning and a draft roll for spinning; and rolls for iron-making, such as a bridle roll, a snapper roll and a steering roll.

EXAMPLES

Hereinafter, the present invention will be more specifically described with reference to Examples and Comparative Examples, but the present invention is not intended to be limited to such Examples. Hereinafter, unless particularly noted, "part(s)" is on a weight basis. The test or evaluation methods of physical properties and characteristics are as follows.

Content, rate of particle having particle size of 5 µm or more in particle size distribution in latex, determined on number basis The content rate of a particle having a particle size of 5 μm or more in the particle size distribution of a particle, included in the synthetic polyisoprene latex, as determined on a number basis, was measured by use of a pore electrical resistance-type particle size distribution measurement apparatus (trade name "Coulter Counter Multisizer 3", manufactured by Beckman Coulter, Inc.).

Mechanical Stability of Latex

The mechanical stability of the latex was evaluated according to the method described in "Determination of Mechanical Stability" in ASTM D1417-10.

That is, the mechanical stability was measured using "MS-5114" (manufactured by Ueshima Seisakusho Co., Ltd.) or "LL5110NA MK3" (manufactured by Source 2 trade Ltd). Herein, a stirring disc was used in measurement, in which the diameter and the thickness, prescribed in ASTM D1076-10, were 20.83 (mm)±0.03 (mm) and 1.57 (mm)±0.05 (mm), respectively. As a glass beaker was used a glass beaker prescribed in ASTM D1417-10, in which the inner diameter was 57.8 (mm)±1 (mm). In a specific measurement method, 50 g of the synthetic polyisoprene latex was accurately weighed and stirred under a condition of a number of rotations of 14,000 rpm for 30 minutes. The synthetic polyisoprene latex after stirring was filtered through an 80-mesh wire cloth, thereafter the mesh was washed with soap water and the soap was washed off with distilled water, and thereafter the resultant was dried at 105° C. for 2 hours. After the drying, the residue substance on the wire cloth was weighed, and the ratio (unit:% by weight) relative to 50 g of the synthetic polyisoprene latex was calculated and the mechanical stability was evaluated based on the resulting value. It can be determined that, as the value is smaller, the mechanical stability is more excellent and the storage stability of the latex is more excellent.

Aggregate Content in Latex Composition

Two g of the latex composition was accurately weighed (weight: X2) in an aluminum dish (weight: X1), and dried at 105° C. in a hot air drier for 2 hours. Next, the dried product was cooled in a desiccator and weighed together with the aluminum dish (weight: X3), and the solid content concentration in the latex composition was calculated according to the following calculation expression.

Solid content concentration (% by weight)=(X3−X1)×100/X2

Next, about 100 g of the latex composition was accurately weighed, and thereafter filtered through a 200-mesh SUS wire, cloth having a known weight, and an aggregate on the wire cloth was washed with water several times to remove the polymer latex. After the aggregate was dried at 105° C. for 60 minutes, the dry weight thereof was measured to determine the aggregate content (unit: % by weight) in the latex composition based on the following expression:

Aggregate content={(α−β)/(γ×Δ)}×10,000 wherein α, β, γ, and Δ represent the weight of the wire cloth after drying and the dried aggregate, the weight of the wire cloth, the weight of the latex composition, and the weight of the solid content concentration in the latex composition, respectively.

Tensile Strength and Elongation of Dip Molded Article

The tensile strength and elongation of the dip molded article were measured based on ASTM D412. Specifically, the dip molded article was subjected to punching by a dumbbell (Die-C) to produce a test piece for measurement, and the resulting test piece was palled by a Tensilon universal tester ("RTC-1225A" manufactured by ORIENTEC Co., LTD) at a tension rate of 500 nm/min to measure the tensile strength (unit: MPa) immediately before breakage and the elongation (unit: %) immediately before breakage.

Example 1

(Production of Synthetic Polyisoprene Latex (f-1))

Synthetic polyisoprene having a weight average molecular weight of 1,300,000 (trade name "NIPOL IR2200L", produced by Zeon Corporation, homopolymer of isoprene obtained by use of Ziegler type polymerization catalyst, amount of cis bond unit: 98% by weight) was mixed with cyclohexane, and dissolved with the temperature being raised to 60° C. under stirring, to prepare cyclohexane solution (a) of synthetic polyisoprene.

On the other hand, 10 parts of sodium rosinate, 5 parts of sodium dodecylbenzenesulfonate and water were mixed to prepare aqueous surfactant solution (b) containing a mixture of sodium rosinate and sodium dodecylbenzenesulfonate at a weight ratio of 2/1, having a concentration of 1.5% by weight at a temperature of 60° C.

Next, cyclohexane solution (a) and anionic aqueous surfactant solution (b) described above were used to obtain a finely-dispersed emulsified liquid by the production apparatus illustrated in the drawing. In the present Example, trade name "multiline mixer MS26-MMR-5.5L" (manufactured by Satake Chemical Equipment Mfg., Ltd.) was used as the mixer 10, and trade name "Milder MDN310" (manufactured by Pacific Machinery & Engineering Co., Ltd.) was used as the rotor/stator emulsifying machine 20.

Specifically, cyclohexane solution (a) and anionic aqueous surfactant solution (b) were mixed using the mixer 10 such that the weight ratio was 1:1.2 (the solid content ratio here was as follows: polyisoprene:surfactant=50:9), and thereafter subjected to the first dispersion treatment in the rotor/stator emulsifying machine 20 to obtain coarsely-dispersed emulsified liquid (c-1), and coarsely-dispersed emulsified liquid (c-1) obtained was recovered in the storage tank 30. In the present Example, the first dispersion treatment was performed under a condition where the first dispersion energy $F_1$ in the first dispersion treatment satisfied $F_1=8.53\times10^7$.

Coarsely-dispersed emulsified liquid (c-1) was then returned again through the reflux pipe 40 to the mixer 10, stirred in the mixer 10, sent again to the rotor/stator emulsifying machine 20, and subjected to the second dispersion treatment in the rotor/stator emulsifying machine 20 to obtain finely-dispersed emulsified liquid (d-1), and finely-dispersed emulsified liquid (d-1) obtained was recovered in the distillation tank 50. In the present Example, the second dispersion treatment was continuously performed for a treatment time (namely, 3 passes with respect to the second dispersion treatment) which corresponded to a time taken for treating the volume three times the volume of coarsely-dispersed emulsified liquid (c-1) in the rotor/stator emulsifying machine 20 such that the second dispersion energy $F_2$ in the second dispersion treatment satisfied $F_2=7.89\times10^7$. In other words, in the present Example, the first dispersion treatment and the second dispersion treatment were performed under a condition where the total dispersion energy $F_{total}$ satisfied $F_{total}=1.64\times10^8$ ($F_1+F_2=8.53\times10^7+7.89\times10^7$).

Next, finely-dispersed emulsified liquid (d-1) was warmed to 80° C. under a reduced pressure of −0.01 to −0.09 MPa (gauge pressure) in the distillation tank 50, and cyclohexane was distilled off to thereby provide finely-dispersed emulsified liquid (e-1) from which the solvent was distilled off.

Next, finely-dispersed emulsified liquid (e-1) obtained, from which the solvent was distilled off, was taken out from the distillation tank 50, and subjected to centrifugation by use of a continuous centrifuge machine (trade name "SRG610", manufactured by ALFA LAVAL) at 4,000 to 9,000 G, thereby obtaining synthetic polyisoprene latex (f-1) having a solid content concentration of 61.0% by weight, as a light liquid. Synthetic polyisoprene latex (f-1) obtained was then used to perform mechanical stability measurement. The results are shown in Table 1.

(Preparation of Latex Composition)

While synthetic polyisoprene latex, (f-1) obtained was stirred, 1.5 parts of zinc oxide, 1.5 parts of sulfur, 3 parts of an antioxidant (trade name "Wingstay L", manufactured by Goodyear Tire and Rubber Company), 0.3 parts of zinc diethyldithiocarbamate, 0.5 parts of zinc dibutyldithiocarbamate and 0.7 parts of zinc mercaptobenzothiazole, in terms of the solid content based on 100 parts of the synthetic polyisoprene in synthetic polyisoprene latex (f-1), were added in the form of water dispersion liquids of such respective compounding agents, and thereafter an aqueous potassium hydroxide solution was added to adjust the pH to 10.5, thereby obtaining a latex composition. Thereafter, the resulting latex composition was aged in a constant temperature water bath adjusted at 30° C., for 48 hours. The resulting latex composition after aging was then subjected to measurement of the content, of an aggregate.

(Production of Dip Molded Article)

A commercially available ceramic hand mold (manufactured by Shinko Ceramics Co., Ltd.) was washed, pre-heated in an oven at 70° C., thereafter dipped in an aqueous coagulating agent solution including 18% by weight of calcium nitrate and 0.05% by weight of polyoxyethylene lauryl ether (trade name "Emulgen 109P", produced by Kao Corporation) for 5 seconds, and then taken out. Next, the hand mold covered with the coagulating agent was dried in an oven at 70° C. for 30 minutes or more.

Thereafter, the hand mold covered with the coagulating agent was taken out from the oven, and dipped in the latex composition for 10 seconds. Next, the hand mold was air dried at room temperature for 10 minutes and then dipped in warm water at 60° C. for 5 minutes. Furthermore, the hand mold was placed in an oven at 130° C., subjected to vulcanization for 30 minutes and thereafter cooled to room temperature, talc was spread thereon, and then peeling off from the hand mold was made to thereby obtain a dip molded article. The tensile strength and the elongation of the resulting dip molded article were measured according to the above-mentioned methods. The results are shown in Table 1.

Example 2

(Production of Synthetic Polyisoprene Latex (f-2))

Synthetic polyisoprene latex (f-2) was produced and evaluated in the same manner as in Example 1 except that the second dispersion treatment was continuously performed for a treatment time (namely, 2 passes with respect to the second dispersion treatment) which corresponded to a time taken for treating the volume twice the volume of coarsely-dispersed emulsified liquid (c-1) in the rotor/stator emulsifying machine 20 such that the second dispersion energy $F_2$ in the second dispersion treatment satisfied $F_2=5.26\times10^7$. The results are shown in Table 1. In other words, in Example 2, the first dispersion treatment and the second dispersion treatment, were performed under a condition where the total dispersion energy $F_{total}$ satisfied $F_{total}=1.38\times10^8$ ($F_1+F_2=8.53\times10^7+5.26\times10^7$).

(Preparation of Latex Composition and Production of Dip Molded Article)

A latex composition and a dip molded article were obtained and evaluated in the same manner as in Example 1 accept that synthetic polyisoprene latex (f-2) obtained above was used. The results are shown in Table 1.

Example 3

(Production of Synthetic Polyisoprene Latex (f-3))

Synthetic polyisoprene latex (f-3) was produced and evaluated in the same manner as in Example 1 except that the second dispersion treatment was performed for a treatment time (namely, 1 pass with respect to the second dispersion treatment) which corresponded to a time taken for treating the same volume as the volume of coarsely-dispersed emulsified liquid (c-1) in the rotor/stator emulsifying machine 20 such that the second dispersion energy $F_2$ in the second dispersion treatment satisfied $F_2=2.63\times10^7$. The results are shown in Table 1. In other words, in Example 3, the first dispersion treatment and the second dispersion treatment were performed under a condition where the total dispersion energy $F_{total}$ satisfied $F_{total}=1.12\times10^8$ ($F_1+F_2=8.53\times10^7+2.63\times10^7$).

(Preparation of Latex Composition and Production of Dip Molded Article)

A latex composition and a dip molded article were obtained and evaluated in the same manner as in Example 1 except that synthetic polyisoprene latex (f-3) obtained above was used. The results are shown in Table 1.

Comparative Example 1

(Production of Synthetic Polyisoprene Latex (f-4))

Synthetic polyisoprene latex (f-4) was produced and evaluated in the same manner as in Example 1 except that the second dispersion treatment was not performed. The results are shown in Table 1.

(Preparation of Latex Composition and Production of Dip Molded Article)

A latex composition and a dip molded article were obtained and evaluated in the same manner as in Example 1 except that synthetic polyisoprene latex (f-4) obtained above was used. The results are shown in Table 1.

Comparative Example 2

(Production of Synthetic Polyisoprene Latex (f-5))

Synthetic polyisoprene latex (f-5) was produced and evaluated in the sane manner as in Example 1 except that, not only the first dispersion treatment was performed such that the first dispersion energy $F_1$ in the first dispersion treatment satisfied $F_1=2.63\times10^7$, thereby obtaining coarsely-dispersed emulsified liquid (c-5), but also the second dispersion treatment was performed for a treatment time (namely, 1 pass with respect to the second dispersion treatment) which corresponded to a time taken for treating the same volume as the volume of coarsely-dispersed emulsified liquid (c-5) in the rotor/stator emulsifying machine 20 such that the second dispersion energy $F_2$ in the second dispersion treatment satisfied $F_2=2.63\times10^7$. In other words, in Comparative Example 2, the first dispersion treatment and the second dispersion treatment were performed under a condition where the total dispersion energy $F_{total}$ satisfied $F_{total}=5.26\times10^7$ ($F_1+F_2=2.63\times10^7+2.63\times10^7$).

(Preparation of Latex Composition and Production of Dip Molded Article)

A latex composition and a dip molded article were obtained and evaluated in the same manner as in Example 1 except that synthetic polyisoprene latex (f-5) obtained above was used. In Comparative Example 2, when the dip molded article was obtained, dip molding was performed after removal of an aggregate in the latex composition by filtration. The results are shown in Table 1.

Comparative Example 3

(Production of Synthetic Polyisoprene Latex (f-6))

Synthetic polyisoprene latex (f-6) was produced and evaluated in the sane manner as in Example 1 except that not only the first dispersion treatment was performed by use of not the rotor/stator emulsifying machine 20, but only the mixer 10 (trade name "multiline mixer MS26-M4R-5.5L" (manufactured by Satake Chemical Equipment Mfg., Ltd.)) such that the first dispersion energy $F_1$ in the first dispersion treatment satisfied $F_1=5.35\times10^6$, thereby obtaining coarsely-dispersed emulsified liquid (c-6), but also the second dispersion treatment was performed for a treatment time (namely, 19 passes with respect to the second dispersion treatment) which corresponded to a time taken for treating the volume nineteen times the volume of coarsely-dispersed emulsified liquid (c-6) in the rotor/stator emulsifying machine 20 such that the second dispersion energy $F_2$ in the second dispersion treatment satisfied $F_2=1.02\times10^8$. In otherwords, in Comparative Example 3, the first dispersion treatment and the second dispersion treatment, were performed under a condition where the total dispersion energy $F_{total}$ satisfied $F_{total}=1.07\times10^8$ ($F_1+F_2=5.35\times10^6+1.02\times10^8$).

(Preparation of Latex Composition and Production of Dip Molded Article)

A latex composition and a dip molded article were obtained and evaluated in the sane manner as in Example 1 except that synthetic polyisoprene latex (f-6) obtained above was used. In Comparative Example 3, when the dip molded article was obtained, dip molding was performed after removal, of an aggregate in the latex composition by filtration. The results are shown in Table 1.

distribution of the synthetic rubber particle included in the latex, as determined on a number basis, was 3,000 ppm by weight or more, the latex was inferior in mechanical stability as the latex and thus was low in storage stability as the latex, caused an additional step for removal of an aggregate, or the like, to be needed in a subsequent step, and not only was inferior in productivity, but also was deteriorated in production efficiency (yield) due to the occurrence of an aggregate (Comparative Examples 1 and 2). In Comparative Example 1, while the amount of an aggregate in the latex composition was not large, the resulting latex was inferior in mechanical stability as the latex and thus was low in storage stability as the latex, and therefore was considered to cause an aggregate to occur in a significant amount after storage.

In Comparative Example 3, the resulting latex was extremely low in stability and could not be subjected to measurement of the content rate of a particle having a particle size of 5 μm or more in the particle size distribution, and was consequently extremely large in the amount of an aggregate when formed into a latex composition.

REFERENCE SIGNS LIST

10 . . . mixer
20 . . . rotor/stator emulsifying machine
30 . . . storage tank
40 . . . reflux pipe
50 . . . distillation tank

The invention claimed is:

1. A latex of a synthetic rubber, wherein a content rate of a particle having a particle size of 5 μm or more in a particle size distribution of a synthetic rubber particle comprised in the latex, as determined on a number basis, is less than 3,000 ppm by weight.

2. The latex of a synthetic rubber according to claim 1, wherein the synthetic rubber corresponds to synthetic polyisoprene and/or a styrene-isoprene-styrene block copolymer.

3. A latex composition comprising the latex of a synthetic rubber according to claim 1, and a vulcanizing agent and/or a vulcanization accelerator.

4. A film molded article comprising the latex composition according to claim 3.

TABLE 1

| | | Example | | | Comparative Example | | |
|---|---|---|---|---|---|---|---|
| | | 1 | 2 | 3 | 1 | 2 | 3 |
| First dispersion energy $F_1$ | | $8.53\times10^7$ | $8.53\times10^7$ | $8.53\times10^7$ | $8.53\times10^7$ | $2.63\times10^7$ | $5.35\times10^6$ |
| Second dispersion energy $F_2$ | | $7.89\times10^7$ | $5.26\times10^7$ | $2.63\times10^7$ | — | $2.63\times10^7$ | $1.02\times10^8$ |
| Total dispersion energy $F_{total}$ | | $1.64\times10^8$ | $1.38\times10^8$ | $1.12\times10^8$ | $8.53\times10^7$ | $5.26\times10^7$ | $1.07\times10^8$ |
| Content of particle of 5 μm or more in latex | (ppm by weight) | 990 | 1930 | 2594 | 8491 | 3775 | Unmeasurable |
| Mechanical stability of latex | (%) | 0.0372 | 0.031 | 0.231 | 4.025 | 1.037 | >30 |
| Aggregate content in latex composition | (% by weight) | 0.01 | 0.01 | 0.01 | 0.02 | 0.79 | 3.88 |
| Tensile strength of dip molded article | (MPa) | 24.2 | 23.2 | 23.6 | 23.8 | 22.9 | 18.3 |
| Elongation of dip molded article | (%) | 875 | 892 | 888 | 910 | 974 | 1070 |

From Table 1, a latex in which the content rate of a particle having a particle size of 5 μm or more in the particle size distribution of the synthetic rubber particle included in the latex, as determined on a number basis, was less than 3,000 ppm by weight was excellent in mechanical stability as the latex, was also suppressed low in content of an aggregate when formed into a latex composition, and furthermore provided a dip molded article high in tensile strength and elongation (Examples 1 to 3).

On the other hand, when the content rate of a particle having a particle size of 5 μm or more in the particle size 5. An adhesive layer formation substrate comprising an adhesive layer formed by use of the latex of a synthetic rubber according to claim 1, on a substrate.

6. A method for producing a latex of a synthetic rubber, comprising:

a first step of mixing a polymer solution or a polymer dispersion liquid of a synthetic rubber, obtained by dissolution or dispersion of the synthetic rubber in an organic solvent, with an aqueous surfactant solution or a surfactant dispersion liquid obtained by dissolution or dispersion of a surfactant in water, to thereby obtain a mixture;

a second step of subjecting the mixture to a first dispersion treatment in a rotor/stator emulsifying machine, to thereby obtain a coarsely-dispersed emulsified liquid; and a third step of subjecting the coarsely-dispersed emulsified liquid to a second dispersion treatment in a rotor/stator emulsifying machine, to thereby obtain a finely-dispersed emulsified liquid;

wherein when a dispersion energy F determined according to the following expressions (1) and (2) is defined as follows: a dispersion energy F applied to the mixture in the first dispersion treatment in the second step is defined as a first dispersion energy $F_1$, a dispersion energy F applied to the coarsely-dispersed emulsified liquid in the second dispersion treatment in the third step is defined as a second dispersion energy $F_2$, and a sum of the first dispersion energy $F_1$ and the second dispersion energy $F_2$ is defined as a total dispersion energy $F_{total}$, the first dispersion treatment and the second dispersion treatment are performed such that the first dispersion energy $F_1$ is $8.0 \times 10^7$ or more and the total dispersion energy $F_{total}$ is $1.0 \times 10^8$ or more:

$$F_1 = (V_1 \times N_1 \times P_1 \times S_1)/Q_1^2 \quad (1)$$

wherein $V_1$ represents a circumferential speed (m/s) of a rotor in the first dispersion treatment, $N_1$ represents a synthesis frequency (Hz) of the emulsifying machine in the first dispersion treatment, $P_1$ represents a volume (m³) of an emulsification chamber in the first dispersion treatment, $S_1$ represents a cross-sectional area (m²) of each slit provided on a rotor and a stator in the first dispersion treatment, and $Q_1$ represents a dispersion treatment speed (m³/s) in the first dispersion treatment, $$F_2 = (V_2 \times N_2 \times P_2 \times S_2)/Q_2^2 \quad (2)$$

wherein $V_2$ represents a circumferential speed (m/s) of a rotor in the second dispersion treatment, $N_2$ represents a synthesis frequency (Hz) of the emulsifying machine in the second dispersion treatment, $P_2$ represents a volume (m³) of an emulsification chamber in the second dispersion treatment, $S_2$ represents a cross-sectional area (m²) of each slit provided on a rotor and a stator in the second dispersion treatment, and $Q_2$ represents a dispersion treatment speed (m³/s) in the second dispersion treatment.

7. The method for producing a latex of a synthetic rubber according to claim 6, wherein the second dispersion energy $F_2$ is $2.0 \times 10^7$ or more.

* * * * *